(12) United States Patent
Johnson

(10) Patent No.: US 6,406,077 B2
(45) Date of Patent: Jun. 18, 2002

(54) TUBE WITH EXTRUDED FLANGES HOLDING WALL-REINFORCING INSERT

(75) Inventor: Marc Richard Johnson, Grand Rapids, MI (US)

(73) Assignee: Shape Corporation, Grand Haven, MI (US)

(*) Notice: Subject to any disclaimer, the term of this patent is extended or adjusted under 35 U.S.C. 154(b) by 0 days.

(21) Appl. No.: 09/852,365

(22) Filed: May 10, 2001

Related U.S. Application Data

(60) Provisional application No. 60/203,559, filed on May 11, 2000.

(51) Int. Cl.[7] .............................................. B60R 19/02
(52) U.S. Cl. ..................... 293/102; 293/120; 293/136; 293/155
(58) Field of Search ................................. 293/102, 120, 293/122, 155, 154; 49/489.1

(56) References Cited

U.S. PATENT DOCUMENTS

| | | | |
|---|---|---|---|
| 426,559 A | 4/1890 | Dithridge | |
| 1,246,456 A | 11/1917 | Parpert | |
| 1,575,208 A | 3/1926 | Jacobs | |
| 1,675,910 A | 7/1928 | Riker | |
| 2,067,945 A | 1/1937 | Peters | |
| 2,961,760 A | 11/1960 | Horton et al. | |
| 3,068,029 A | 12/1962 | Schwartz | |
| 3,082,850 A | 3/1963 | Weening | |
| 3,666,310 A | * 5/1972 | Burgess et al. | 293/120 |
| 3,680,897 A | 8/1972 | Linthout | |
| 3,843,182 A | * 10/1974 | Walls et al. | 293/122 |
| 3,888,531 A | * 6/1975 | Straza et al. | 293/120 |
| 4,010,533 A | 3/1977 | Pitner | |
| 4,029,350 A | * 6/1977 | Goupy et al. | 293/122 |
| 4,030,744 A | 6/1977 | Schwuchow et al. | |
| 4,200,318 A | * 4/1980 | Gute et al. | 293/136 |
| 4,233,726 A | 11/1980 | Williams | |
| 4,242,969 A | 1/1981 | Checkwood et al. | |
| 4,272,115 A | 6/1981 | Stock | |
| 4,333,672 A | 6/1982 | Arthur et al. | |
| 4,413,856 A | * 11/1983 | McMahan et al. | 293/120 |
| 4,431,221 A | 2/1984 | Jahnle | |
| 4,829,979 A | * 5/1989 | Moir | 293/155 |
| 4,884,665 A | 12/1989 | Parker et al. | |
| 4,924,584 A | * 5/1990 | Harney | 29/509 |
| 4,974,891 A | 12/1990 | Furuta | |
| 5,078,439 A | 1/1992 | Terada et al. | |
| 5,104,026 A | * 4/1992 | Sturrus et al. | 228/146 |
| 5,114,198 A | * 5/1992 | Yamashita et al. | 293/120 |

(List continued on next page.)

FOREIGN PATENT DOCUMENTS

| | | | |
|---|---|---|---|
| DE | 3325104a1 | * | 1/1985 |
| EP | 0 582 524 | * | 8/1993 |
| GB | 2134858 | * | 2/1983 |
| JP | 57 87742 | * | 6/1982 |
| JP | 57 172848 | * | 10/1982 |
| JP | 58 89438 | * | 5/1983 |
| JP | 55 102746 | * | 8/1989 |

Primary Examiner—Ken Patel
(74) Attorney, Agent, or Firm—Price Heneveld Cooper DeWitt & Litton

(57) ABSTRACT

A tubular bumper beam for automobiles includes a roll-formed tubular beam and tubular inserts positioned transversely in end sections of the beam. The illustrated tubular insert includes front and rear ends positioned adjacent the front and rear walls of the tubular beam in a manner that reinforces the front and rear walls for improved corner impact strength. Material is extruded from the beam walls into the ends of the insert to form deformed tubular portions that telescopingly extend into the tubular insert to retain the insert in the beam, and further include radiused annular root sections that connect the tubular portions with the walls of the beam, and still further optionally include dished areas around the root sections that help stabilize the beam walls. A method related to the above is also disclosed.

17 Claims, 1 Drawing Sheet

U.S. PATENT DOCUMENTS

| | | | |
|---|---|---|---|
| 5,201,912 A | * | 4/1993 | Terada et al. ............... 293/120 |
| 5,498,096 A | | 3/1996 | Johnson |
| 5,606,790 A | | 3/1997 | Laue |
| 5,660,012 A | | 8/1997 | Knudson |
| 5,732,801 A | * | 3/1998 | Gertz ......................... 293/132 |
| 5,882,064 A | | 3/1999 | Emmons |
| 2001/0017473 A1 | * | 8/2001 | Yamamoto .................. 293/102 |
| 2001/0038214 A1 | * | 11/2001 | Braun ......................... 293/120 |
| 2002/0005644 A1 | * | 1/2002 | Tamada et al. ............. 293/120 |

* cited by examiner

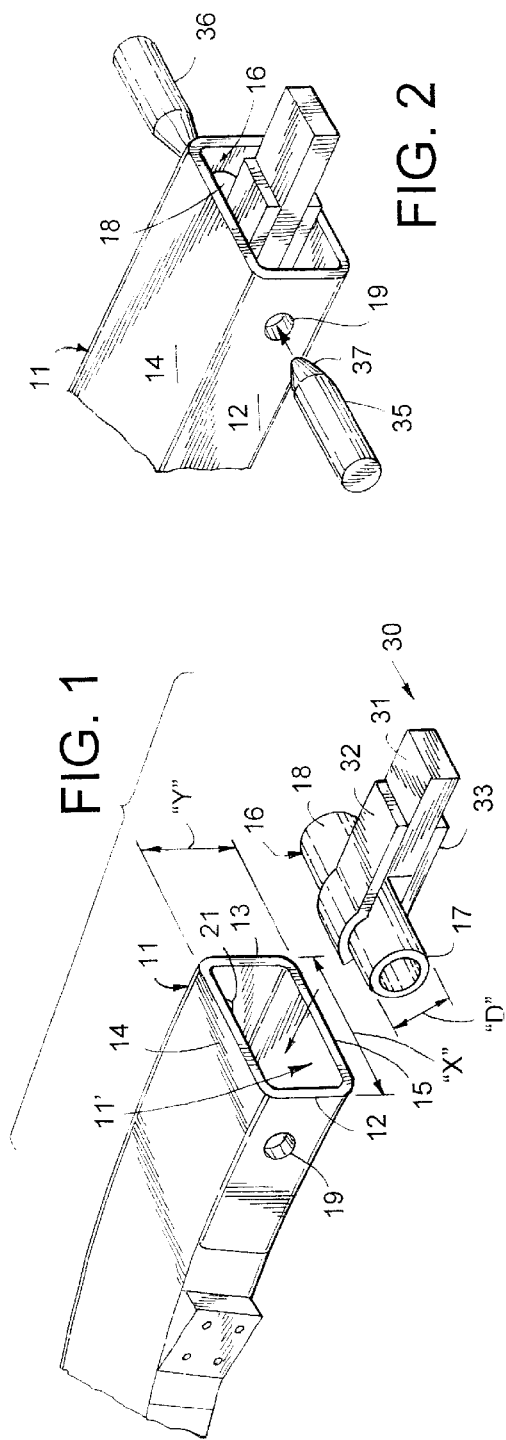
FIG. 1
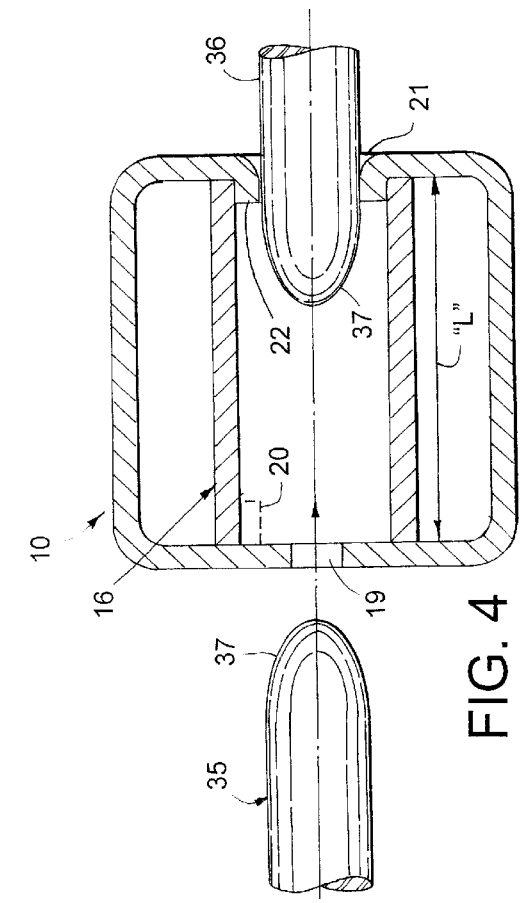
FIG. 2
FIG. 4
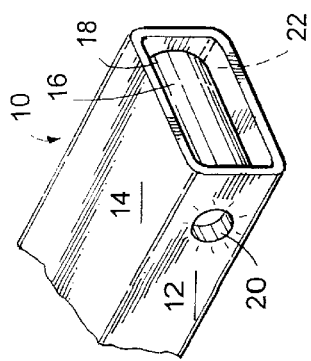
FIG. 3

TUBE WITH EXTRUDED FLANGES HOLDING WALL-REINFORCING INSERT

CROSS-REFERENCE TO RELATED APPLICATIONS

The present application claims benefit under 35 USC §119(e) of provisional application serial No. 60/203,559, filed May 11, 2000, entitled TUBE WITH EXTRUDED FLANGES HOLDING WALL-REINFORCING INSERTS, the entire contents of which are incorporated herein by reference.

BACKGROUND OF INVENTION

The present application concerns tubes, such as a tubular automotive front bumper beam or door beam, or a tubular bracket for furniture, and more particularly concerns a tube having an insert positioned within the tube to prevent premature collapse upon experiencing impact or high bending stress.

Tubular bumpers have received wide acceptance in the automotive market based on their high strength-to-weight ratio. However, further improvements are desired to stabilize predetermined areas on certain wall sections of tubular bumper beams for improved impact strength. For example, it is desirable in some bumper beam designs to better stabilize the front and rear wall sections near ends of the bumper beam where added strength is desired to withstand corner impacts. Also, added stability may be desired on the rear wall in the area of the frame-to-bumper mounts.

Some tubular bumper constructions have walls that are stabilized by addition of foam or other polymeric inserts located inside or outside the tubular bumpers. However, this can add an undesirable amount of cost and weight to the bumpers. Other bumper constructions have welded brackets and braces attached to the tubular bumpers. However, this can add cost and weight, as well as complexity to the assembly (including additional parts and pieces), quality problems, added secondary processes, additional inventory, fixturing problems, etc.

Accordingly, a tubular assembly solving the aforementioned problems and having the aforementioned advantages is desired, as well as the associated methods and apparatus.

SUMMARY OF THE INVENTION

In one aspect of the present invention, an article includes a tubular beam having a front wall and a rear wall that define a cavity, a tubular insert located in the cavity, and having front and rear ends adjacent the front and rear walls, respectively. The front wall has an integrally formed first extruded flange extending into the front end of the tubular insert, and the rear wall has an integrally formed second extruded flange extending into the rear end of the tubular insert. The first and second extruded flanges hold the tubular insert in place.

In another aspect of the present invention, a vehicle bumper construction includes a tubular beam of high strength material suitable for use as a vehicle bumper beam. The tubular beam has front, rear, top and bottom walls, and further has vehicle mounts for mounting the beam to a vehicle frame, with at least one of the walls having contiguous insert-retaining material. A wall-reinforcing insert has a cavity aligned with the insert-retaining material, and a retainer is integrally formed from the insert-retaining material of the one wall by deformed portions of the material that extend telescopingly inwardly into the cavity and into the insert to thus retain the insert in the tubular beam.

In another aspect of the present invention, a method comprises steps of providing a tubular beam having a front wall and a rear wall that define a cavity, and locating a tubular insert in the cavity with front and rear ends located adjacent the front and rear walls, respectively. The method further includes integrally forming a first extruded flange from the front wall including extending a tubular portion of the first extruded flange into the front end of the tubular insert, and further includes integrally forming a second extruded flange from the rear wall including extending a tubular portion of the second extruded flange into the rear end of the tubular insert, such that the first and second extruded flanges hold the tubular insert in place.

In yet another aspect of the present invention, a method comprises steps of providing a tubular beam made of high strength material adapted for use as a vehicle bumper beam, the tubular beam having front, rear, top and bottom walls, and including end sections and vehicle mounts located inboard of the end sections. The method further includes providing wall-reinforcing tubular inserts having a cavity, and placing the inserts transversely in the end sections of the tubular beam. The method still further includes forming a retainer from integral and continuous material in at least one of the walls in the end sections by telescopingly deforming the material of the one wall inwardly into the cavity to thus provide a main retention of the insert in the tubular beam.

These and other features, advantages, and objects of the present invention will be further understood and appreciated by those skilled in the art by reference to the following specification, claims, and appended drawings.

BRIEF DESCRIPTION OF THE INVENTION

FIG. 1 is a perspective view of a tubular beam, a wall-reinforcing tubular insert, and a fixture for holding the insert in a predetermined position within the tubular beam;

FIG. 2 is a perspective view of FIG. 1, with the insert being held within an end of the tubular beam, and with tapered extrusion punches positioned to engage the walls to form the extruded holding flanges for permanently holding the insert;

FIG. 3 is a perspective view of FIG. 2, with the extruded holding flanges fully formed and holding the insert in position; and FIG. 4 is a cross sectional view showing the extruding process, with the extruded holding flange on the left side not yet formed, and the extruded holding flange on the right side already formed.

DETAILED DESCRIPTION OF PREFERRED EMBODIMENT

A bumper beam 10 (FIG. 1) for automobiles includes a tubular beam 11 having front, rear, top, and bottom walls 12–15, respectively, that define a cavity 11'. For example, an exemplary tubular beam 11 is shown and described in Sturrus U.S. Pat. No. 5,104,026, the entire contents of which are incorporated herein by reference. A tubular wall-reinforcing insert 16 is located in the cavity 11' at each end of the beam 11, so that the insert 16 is located in cantilevered ends of the beam 11, outside of the bumper mounts to a vehicle frame, at a location where corner impacts often occur in vehicles. The tubular insert 16 includes front and rear ends 17 and 18 positioned in the cavity 11' adjacent the front and rear walls 12 and 13, respectively, in a manner that reinforces the front and rear walls 12 and 13 for improved impact strength. The front wall 12 has a hole 19 defined by marginal material of the front wall 12. The marginal material is inwardly extruded to form an integrally formed first extruded flange 20 that extends into the front end 17 of the tubular insert 16. The rear wall 13 also has a hole 21 (similar to hole 19) defined by marginal material of the rear wall 13. The marginal material is inwardly extruded to form an integrally formed second extruded flange 22 that extends into the rear end 18 of the tubular insert 16.

It is contemplated that the present article can be used in many applications where a tubular beam is needed, but where the tubular beam requires added support for opposing walls, or where it is desirable to retain an insert within the tubular beam without the use of separate fasteners or retainers. In some applications, it is contemplated that only one extruded holding flange is required.

The apparatus for forming the present tubular beam 10 includes the following. It is contemplated that a scope of the present invention includes any apparatus or method that utilizes the present fixturing and methods, whether the tubular beam is rollformed or extruded or otherwise created. For example, see the rollforming apparatus and method described in Sturrus U.S. Pat. No. 5,104,026.

The tubular beam 11 (FIG. 1) is a rollformed steel beam (although other materials could be used) created with a predetermined cavity dimension of "X" and "Y", with the "X" dimension being between the front and rear walls 12 and 13. The illustrated wall-reinforcing insert 16 made of HLSA steel having a tensile strength of about 80 KSI, (although different strength materials can be used) and has a length "L" and a diameter "D", with the "L" dimension being closely equal to the "X" dimension, and with the diameter "D" being less than the "Y" dimension. A fixture 30 includes a rigid arm 31, and opposing resilient fingers 32 and 33. The fingers 32 and 33 include arcuate sections shaped to mateably engage opposing sides of the insert 16, and have resilient leaf-spring-like elongated sections for flexibly supporting the arcuate sections. The insert 16 can be inserted into the fingers 32 and 33 by pressing the insert 16 against an open end of the fixture 30 with sufficient force to cause the fingers 32 and 33 to flex temporarily apart. Alternatively, other holders can be used in place of fingers 32 and 33, such as magnets, clamps, and other releasable holding devices. The fixture 30 is long enough so that the insert 16 can be accurately held in a position with its ends aligned with holes 19 and 21.

A die apparatus includes opposing tapered punches 35 and 36 aligned with the holes 19 and 21. The punches 35 and 36 each have a bullet-shaped nose 37 that self-aligns the punches 35 and 36 with the holes 19 and 21 as the punches 35 and 36 are extended inwardly. As the punches 35 and 36 are further inwardly extended, the large diameter of the shaft of the punches 35 and 36 causes the marginal material forming the holes 19 and 21 to be extruded inwardly into the cavity of the tubular beam 11. Thus, the extruded holding flanges 20 and 22 are formed with a tubular section extending into close engagement with the ends of the insert 16, and with a radiused root section connecting the tubular section with the walls 12 and 13. Further, as the punches 35 and 36 are extended, they form a dish-shaped area on the walls 12 and 13 around the area of the flanges 20 and 22. The punches 35 and 36 are then withdrawn, leaving the insert 16 in a securely held arrangement that does not require extra fasteners. Further, the secondary step of inward extrusion is relatively easily done, and does not require heating or welding of parts, which can degrade the bumper beam. It is noted that, depending on the material of the beam 11 and the insert 16, the holes 19 can be eliminated, if desired. Also, the wall thickness and strength of materials of beam 11 and insert 16 can be varied to meet specific beam functional requirements.

Notably, in many applications, such as where the diameter "D" of the insert 16 is close to the dimension "Y", or where the dimension "X" is relatively short and/or the diameter "D" is large, it may be possible to use only a single holding flange 20. (i.e. It may not be necessary to include both opposing holding flanges 20 and 22.) It is noted that the extruded holding flanges 20 and 22 have an increased strength due to work hardening as they are formed, and also due to the uniformity of their circular shape. Nonetheless, the present invention is also believed to include an inwardly bent tab or the like, particularly where the inwardly bent flange has orthogonally related sections that add strength to the inwardly bent tab or flange.

The method includes providing a tubular beam 11 having a front wall 12 and a rear wall 13 (preferably flat, but not necessarily so) that define a cavity 11', and providing a tubular insert 16 accurately located in the cavity 11' by a fixture with the insert's front and rear ends 17 and 18 adjacent the front and rear walls 12 and 13, respectively. The method further includes integrally forming a first extruded flange 20 from the front wall 12 including extending the first extruded flange 20 into the front end 17 of the tubular insert 16. Similarly, the method includes integrally forming a second extruded flange 22 from the rear wall 13 including extending the second extruded flange 22 into the rear end 18 of the tubular insert 16. In this manner, the first and second extruded flanges 20 and 22 telescope axially into and hold the tubular insert 16 in place in the tubular beam 11 to thus reinforce the bumper 10. It is noted that the marginal material of the walls 12 and 13 around and outside of the flanges 20 and 22 may become flattened or slightly inwardly dished toward the flanges 20 and 22 as the punches 37 enter holes 19. This "dishing" formation adds to retention strength of insert 16 by abutting the marginal material against the ends of the insert 16 and by forming a three-dimensional area around the flanges 20 and 22 in the walls 12 and 13.

In the foregoing description, those skilled in the art will readily appreciate that modifications may be made to the invention without departing from the concepts disclosed herein. Such modifications are to be considered as included in the following claims, unless these claims by their language expressly state otherwise.

The invention claimed is:

1. An article comprising:
a tubular beam having a front wall and a rear wall that define a cavity; and
a tubular insert located in the cavity and having front and rear ends adjacent the front and rear walls, respectively;
the front wall having an integrally formed first extruded flange extending into the front end of the tubular insert, and the rear wall having an integrally formed second extruded flange extending into the rear end of the tubular insert, the first and second extruded flanges holding the tubular insert in place.

2. The article defined in claim 1, wherein at least one of the first and second extruded flanges includes a tubular section that closely engages the tubular insert.

3. The article defined in claim 2, wherein the at least one extruded flange includes a radiused annular root section connecting the tubular section to the wall associated with the at least one extruded flange.

4. The article defined in claim 3, wherein the associated wall includes marginal material around the radiused annular root section that has a dished shape.

5. The article defined in claim 1, wherein the tubular beam is made of a high strength material suitable for use as a bumper beam in a vehicle bumper arrangement, and including mounts attached to the tubular beam at locations spaced inboard of end sections of the tubular beam, one of the tubular inserts being positioned in each of the end sections.

6. The article defined in claim 1, wherein the tubular beam is rollformed and has a continuous and closed cross section.

7. The article defined in claim 1, wherein the tubular beam defines a non-linear longitudinal centerline.

8. The article defined in claim 1, wherein the tubular beam has a rectangular cross sectional shape.

9. The article defined in claim 1, wherein the tubular insert has a length-to-diameter ratio that is at least about 2 to 1.

10. A vehicle bumper construction comprising:

a tubular beam of high strength material suitable for use as a vehicle bumper beam, the tubular beam having front, rear, top, and bottom walls, and further having vehicle mounts for mounting the beam to a vehicle frame, with at least one of the walls having contiguous insert-retaining material;

a wall-reinforcing insert having a cavity aligned with the insert-retaining material; and a retainer integrally formed from the insert-retaining material of the one wall, the retainer including deformed portions of the material that extend telescopingly inwardly into the cavity and into the insert to thus retain the insert in the tubular beam.

11. The vehicle bumper construction defined in claim 10, wherein deformed portions of the insert-retaining material include a tubular section that telescopingly and closely engages the tubular insert.

12. The vehicle bumper construction defined in claim 11, wherein the deformed portions include a radiused annular root section connecting the tubular section to the wall associated with the insert-retaining material.

13. The vehicle bumper construction defined in claim 12, wherein the associated wall includes marginal material around the radiused annular root section that has a dished shape.

14. The vehicle bumper construction defined in claim 10, wherein the tubular beam is made of a high strength material suitable for use as a bumper beam in a vehicle bumper arrangement, and including mounts attached to the tubular beam at locations spaced inboard of end sections of the tubular beam, one of the tubular inserts being positioned in each of the end sections.

15. A method of forming a reinforced beam, comprising steps of:

providing a tubular beam having a front wall and a rear wall that define a cavity;

locating a tubular insert transversely in the cavity with front and rear ends of the insert located adjacent the front and rear walls, respectively;

integrally forming a first extruded flange from the front wall including extending a tubular portion of the first extruded flange into the front end of the tubular insert; and integrally forming a second extruded flange from the rear wall including extending a tubular portion of the second extruded flange into the rear end of the tubular insert, such that the first and second extruded flanges hold the tubular insert in place.

16. The method defined in claim 15, wherein the tubular insert is retained in the tubular beam entirely by the steps of integrally forming the first and second extruded flanges and not by additional steps.

17. A method comprising steps of:

providing a tubular beam made of high strength material adapted for use as a vehicle bumper beam, the tubular beam having front, rear, top and bottom walls, and including end sections and vehicle mounts located inboard of the end sections;

providing wall-reinforcing tubular inserts having a cavity;

placing the inserts transversely in the end sections of the tubular beam; and forming a retainer from integral and continuous material in at least one of the walls in the end sections by telescopingly deforming the material of the one wall inwardly into the cavity to thus provide a main retention of the insert in the tubular beam.

* * * * *